United States Patent Office 2,752,408
Patented June 26, 1956

2,752,408

STABILIZATION OF RUBBER BY ADDING THERETO 1,7-DIHYDROXYNAPHTHALENE

Harry E. Whitmore, Evanston, and Alfred E. Hoffman, Clarendon Hills, Ill., assignors to Universal Oil Products Company, Chicago, Ill., a corporation of Delaware No Drawing. Application December 14, 1951, Serial No. 261,751

4 Claims. (Cl. 260—810)

This invention relates to the stabilization of adhesives and elastomers and more particularly to the use of a novel stabilizing agent in preventing undesired deterioration of these materials.

Adhesives are prepared from special formulations in order to produce an adhesive having the desired properties. Once prepared, a satisfactory adhesive should retain these desired properties for a sufficient length of time to permit satisfactory use of the adhesive. In accordance with the present invention, a novel stabilizing agent is incorporated in the adhesive mass in order to retard undesired changes thereof.

Similarly, elastomers, including rubber, both natural and synthetic, plastics, resins, etc. are prepared from special formulations in order to prepare a product having the desired properties. A satisfactory elastomer should retain these desired properties and, in accordance with the present invention, the novel stabilizing agent is incorporated therein in order to retard deterioration thereof.

In one embodiment the present invention relates to a method of stabilizing a material selected from the group consisting of adhesives and elastomers, which comprises incorporating 1,7-dihydroxynaphthalene in said material.

In a specific embodiment the present invention relates to a method of stabilizing adhesive masses which comprises incorporating therein from about 0.0001% to about 0.01% by weight of 1,7-dihydroxynaphthalene.

In another specific embodiment the present invention relates to a method of stabilizing rubber which comprises incorporating therein from about 0.0001% to about 1% by weight of 1,7-dihydroxynaphthalene.

In the formulation of many adhesive masses, elastomeric materials, such as rubber, resin, etc. are utilized to provide the desired elastomeric properties to the adhesive mass. For example, in cellophane tapes, adhesive tapes, surgical tapes, etc., the adhesive mass employed has elastomeric properties; that is, it may be stretched and, upon release of the stress, will return to its original position. It is important that the adhesive mass retains this property for satisfactory use. As hereinbefore set forth the novel stabilizing agent of the present invention will serve to prevent deterioration of the adhesive mass and thereby to retain the desirable properties thereof.

As hereinbefore set forth, the novel stabilizing agent of the present invention, not only will serve to prevent deterioration of adhesive masses, but also will serve to retard deterioration of the elastomeric materials per se. Rubber, both natural and synthetic, is utilized for many purposes, as also are plastics and resins. In accordance with the present invention, the incorporation of the novel stabilizing agent therein will serve to prevent undesirable deterioration of these materials.

While 1,7-dihydroxynaphthalene generally is preferred, it is understood that one or both of the aromatic rings may contain substituents attached thereto. The substituents preferably are selected from hydrocarbon groups including alkyl, aralkyl, aryl, alkaryl, cycloalkyl, etc. groups, but in some cases the substituent group may include one or more oxygen, nitrogen, sulfur and/or halogen atoms therein. In general, the substituted 1,7-dihydroxynaphthalene should not contain more than about 25 carbon atoms per molecule. It is understood that the various substituted 1,7-dihydroxynaphthalenes are not necessarily equivalent but all of them will serve to stabilize the adhesive and elastomeric materials.

The 1,7-dihydroxynaphthalene preferably is incorporated in the adhesive or elastomer as soon as practical in order that the material will be stabilized during subsequent handling and storage. In the case of synthetic formulations, the 1,7-dihydroxynaphthalene preferably is incorporated during the early part of the formulation and preferably while the mass is in a fluid condition so that the 1,7-diyhdroxynaphthalene may be intimately admixed therein. When the substrate is to undergo vulcanization, the 1,7-dihydroxynaphthalene preferably is incorporated prior to the vulcanization treatment.

The 1,7-dihydroxynaphthalene generally will be utilized in a concentration of not more than about 2% by weight of the adhesive or elastomeric material. When utilized in adhesives or elastomeric materials where transparency is desired, it is preferable to utilize the 1,7-dihydroxynaphthalene in a concentration of not greater than about 0.01% by weight, and thus it will be employed in a concentration of from about 0.0001% to about 0.01% by weight thereof. However, when utilized in opaque or dark colored adhesives or elastomers, the 1,7-dihydroxynaphthalene may be utilized in larger concentrations which may range up to 2% or more thereof.

1,7-dihydroxynaphthalene is readily soluble in adhesive and elastomeric materials and, therefore, is readily incorporated therein. However, it is understood that the 1,7-dihydroxynaphthalene may be employed as a solution in a suitable solvent or as an emulsion and incorporated in this manner into the adhesive elastomer. It is also understood that the 1,7-dihydroxynaphthalene may be used in conjunction with other additives which are to be incorporated in the adhesive or elastomer.

The following examples are introduced to illustrate further the novelty and utility of the present invention but not with the intention of unduly limiting the same.

EXAMPLE I

A commercial batch of adhesive mass, based on natural rubber was prepared. One sample of this adhesive mass was utilized without additive as a blank or control sample. 1% by weight of a commercial amine type additive was incorporated in a second sample of the adhesive mass and was tested as representative of presently used commercial additives. 1% by weight of 1,7-dihydroxynaphthalene was incorporated in a third sample of the adhesive mass. Separate tapes were prepared from the different samples described above and the physical properties thereof were determined.

In the first determination, the samples were aged for two weeks in an oxygen bomb, and the per cent decrease in adhesion after such aging was determined for each sample. These results are reported in the following table:

Table 1

| Additive | Percent Decrease in Adhesion after aging |
|---|---|
| None | 92 |
| Commercial amine type | 61 |
| 1,7-dihydroxynaphthalene | 12 |

From the above data it is apparent that 1,7-dihydroxynaphthalene served to considerably retard decrease in adhesion and that it is considerably better than the presently used amine type additive.

EXAMPLE II

This example reports the degree of delamination after exposure for 72 hours in a Weatherometer.

*Table 2*

| Additive | Degree of Delamination |
|---|---|
| None | Excessive. |
| Commercial amine type | Do. |
| 1,7-dihydroxynaphthalene | None. |

Here again it will be noted that 1,7-dihydroxynaphthalene served to stabilize the adhesive. No delimination occurred in the tape containing this additive. In contrast thereto, excessive delamination encountered with the control sample containing no additive and with the sample containing the commercial amine type additive.

EXAMPLE III 0.03% by weight of 1,7-dihydroxynaphthalene may be incorporated into crude latex rubber prior to vulcanization thereof. This will serve to prevent oxidative deterioration of the rubber.

EXAMPLE IV

Thermoplastic resins as, for example, those produced from cellulose acetate, are rigid at normal temperature but may be deformed or remolded under heating or pressure. 0.8% by weight of 1,7-dihydroxynaphthalene may be incorporated in the resin in order to prevent oxidative deterioration thereof and thereby will serve to retain this desirable property of the resin.

We claim as our invention:

1. Rubber containing from about 0.0001% to about 2% by weight of 1,7-dihydroxynaphthalene.
2. An adhesive mass comprising rubber containing from about 0.0001% to about 2% by weight of 1,7-dihydroxynaphthalene.
3. Rubber containing a stabilizing amount of a 1,7-dihydroxynaphthalene.
4. An adhesive mass comprising rubber containing a stabilizing amount of a 1,7-dihydroxynaphthalene.

References Cited in the file of this patent

UNITED STATES PATENTS

| | | |
|---|---|---|
| 1,947,458 | Calcott et al. | Feb. 20, 1934 |
| 2,324,186 | Armstrong et al. | July 13, 1943 |
| 2,628,953 | Newly | Feb. 17, 1953 |

OTHER REFERENCES

Fette und Seifen (1951), pages 381–384,
Fisher, article in Ind. and Eng. Chem., August 1939, vol. 31, No. 8, page 942.